May 14, 1940.   W. M. HAHNEMANN   2,200,249

SYSTEM FOR LANDING AIRPLANES

Filed Dec. 9, 1937

Inventor:
Walter Max Hahnemann
by R. C. Hopgood
Attorney

Patented May 14, 1940

2,200,249

UNITED STATES PATENT OFFICE 2,200,249

SYSTEM FOR LANDING AIRPLANES

Walter Max Hahnemann, Berlin-Marienfelde, Germany, assignor to C. Lorenz Aktiengesellschaft, Berlin-Tempelhof, Germany, a company Application December 9, 1937, Serial No. 178,897

2 Claims. (Cl. 250—11)

It is well known in aircraft navigation to emit a club-shaped high frequency radiation obliquely upward from a landing ground in order to produce a so-called glide path or slip-way, that is, a zone of equal field intensity which airplanes are to follow when descending.

In this connection it has been found that the ground below such glide path not being of equal electric conductivity throughout affects radiation conditions. This has been ascertained especially in the case of landing grounds provided with a ferro-concrete runway in which the field intensity will be concentrated, rising in the direction of the runway.

Figure 1:
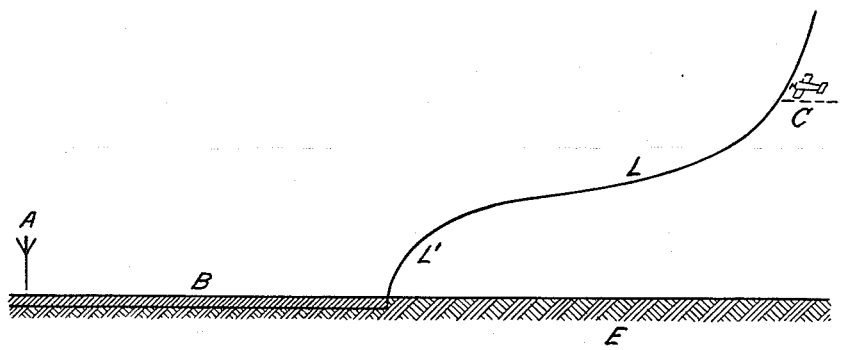
Figure 2:
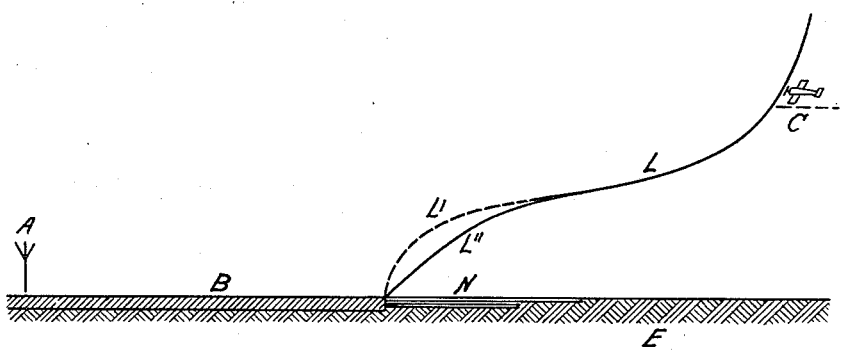
Figure 3:
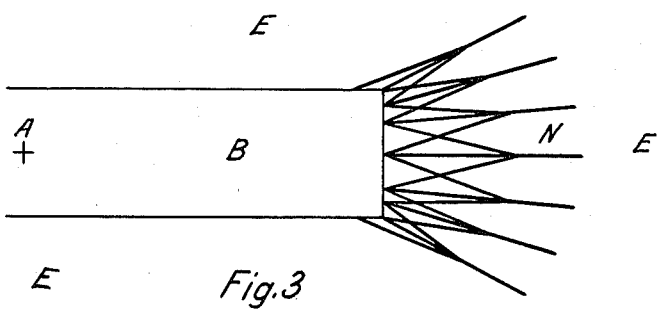

The invention has for its object to improve such radiation conditions, as will be understood from the following description, reference being had to the accompanying drawing in which Fig. 1 is a sectional elevation of a known arrangement for landing airplanes and also shows a graphic representation of the glide path, Fig. 2 is a view similar to Fig. 1 and represents an embodiment of the invention, Fig. 3 is a plan of Fig. 2.

From an antenna A, Fig. 1, a club-shaped radiation is emitted to produce the glide path represented by curve L. B denotes a runway for airplane C. This runway is of ferro-concrete and therefore has a considerably greater electric conductivity than the surrounding ground E, whereby the field intensity greatly increases toward B. As a result, curve L will be steep where it joins the runway B, somewhat of the shape represented in Fig. 1. Curve L is here shown to have a bulge L' through which it passes into the adjacent end of the runway B.

This bulge is not a disadvantage inasmuch as the pilot when landing will discern the boundary lines of the runway B and may thus land thereon without the help of the usual glide path indications. By landing immediately after overflying the boundary line of the runway B he will be able to utilize the entire distance available for the airplane rolling on runway B. If, however, the glide path indication is followed then the airplane thus moving along bulge L' will strike against runway B at too steep an angle.

In accordance with the invention this drawback is overcome by affording a gradual transition from the conductivity of the ferro-concrete runway to that of the surrounding ground. For instance, means having good electric conductivity may to such end be joined to the ferro-concrete way and embedded in the earth's surface.

As shown in Figs. 2 and 3 by way of example, such conductive means may be in the form of wires arranged to constitute a network or the like N. In the case here represented these wires are located like radiating lines. Instead of such arrangement any other conductive structure or assembly may be provided as long as its conductivity is such that there shall be a decrease in conductivity from runway B onward to the surrounding ground E. The bulge L' of the glide path curve L will thus be replaced by a flat or straight part L'', as shown in Fig. 2. Curve L will no longer join the runway B steeply but at a more acute angle, whereby safe landing along the glide path indications is rendered possible. The airplane may descend onto runway B immediately after overflying the boundary limit thereof and may then roll along runway B until it comes to a standstill.

What is claimed is:

1. A system for landing aircraft, comprising a landing ground composed of zones of different electrical conductivity, radio means for producing a glide path to a zone of relatively high conductivity, and means comprising a conductive medium having a gradually decreasing conductivity intermediate said relatively high conductivity and the conductivity of a zone of relatively low conductivity for effecting a gradual transition between said zones whereby the glide path will merge into said zone of high conductivity at an acute angle.

2. A system for landing aircraft, comprising a landing ground composed of zones of different electric conductivities, radio means for producing a glide path to a zone of relatively high conductivity, and means for effecting a gradual transition from said zone of high conductivity to a zone of relatively low conductivity, said means for effecting said transition comprising electrically conductive members set in the earth's surface adjacent said zone of high conductivity, whereby the glide path will merge into said zone of high conductivity at an acute angle.

WALTER MAX HAHNEMANN.